(12) United States Patent
Liu et al.

(10) Patent No.: US 12,209,745 B2
(45) Date of Patent: Jan. 28, 2025

(54) BACKLIGHT MODULE AND DISPLAY DEVICE

(71) Applicant: HKC Corporation Limited, Guangdong (CN)

(72) Inventors: Hao Liu, Guangdong (CN); Baohong Kang, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 18/218,728

(22) Filed: Jul. 6, 2023

(65) Prior Publication Data

US 2024/0159379 A1 May 16, 2024

(30) Foreign Application Priority Data

Nov. 9, 2022 (CN) .......................... 202211397123.4

(51) Int. Cl.
*F21V 5/00* (2018.01)
*F21V 7/05* (2006.01)
(Continued)

(52) U.S. Cl.
CPC ................ *F21V 5/007* (2013.01); *F21V 7/05* (2013.01); *F21V 29/503* (2015.01); *F21V 29/70* (2015.01); *F21Y 2115/10* (2016.08)

(58) Field of Classification Search
CPC .................................... F21V 7/05; F21V 7/007
See application file for complete search history.

(56) References Cited

U.S. PATENT DOCUMENTS 6,091,384 A * 7/2000 Kubota ................ H10K 50/856
345/76
2011/0121340 A1* 5/2011 Seo ......................... H01L 33/56
257/98
(Continued)

FOREIGN PATENT DOCUMENTS

CN 108803142 A 11/2018
CN 110082854 A 8/2019
(Continued)

OTHER PUBLICATIONS

Chinese First Office Action dated Dec. 19, 2022 issued in CN application No. 202211397123.4.
(Continued)

*Primary Examiner* — Evan P Dzierzynski
*Assistant Examiner* — Nathaniel J Lee
(74) *Attorney, Agent, or Firm* — SCULLY, SCOTT, MURPHY & PRESSER, P.C.

(57) ABSTRACT

The present disclosure provides a backlight module and a display device. The backlight module includes a substrate, a light-emitting layer, and a light refracting layer. The light-emitting layer is disposed on the substrate and includes multiple light-emitting units arranged at intervals. The light-emitting unit is configured to emit light. The light-refracting layer includes multiple first medium parts and multiple second medium parts, where the first medium part covers a surface of the light-emitting unit, and the second medium part is arranged between adjacent first medium parts. The first medium part has a first refractive index $n_1$ for light emitted by the light-emitting unit, and the second medium part has a second refractive index $n_2$ for the light emitted by the light-emitting unit, where $n_1 > n_2$.

14 Claims, 6 Drawing Sheets

(51) Int. Cl.
*F21V 29/503* (2015.01)
*F21V 29/70* (2015.01)
*F21Y 115/10* (2016.01)

(56) References Cited

U.S. PATENT DOCUMENTS

2020/0355896 A1\* 11/2020 Woodgate ............. F21V 7/0066
2021/0351381 A1   11/2021 Cai et al.

FOREIGN PATENT DOCUMENTS

| CN | 110727145 A | 1/2020 |
| CN | 113178466 A | 7/2021 |
| CN | 113820888 A | 12/2021 |
| CN | 114464604 A | 5/2022 |
| JP | 2004265985 A | 9/2004 |
| JP | 2009245664 A | 10/2009 |

OTHER PUBLICATIONS

Chinese Second Office Action dated Jan. 12, 2023 issued in CN application No. 202211397123.4.

\* cited by examiner

BACKLIGHT MODULE AND DISPLAY DEVICE

CROSS-REFERENCE TO RELATED APPLICATION(S)

This application claims priority to Chinese Patent Application No. 202211397123.4, filed Nov. 9, 2022, the entire disclosure of which is hereby incorporated by reference.

TECHNICAL FIELD

The present disclosure relates to the field of display technology, and particularly to a backlight module and a display device.

BACKGROUND

A Mini Light-emitting Diode (Mini LED) backlight module (such as a Mini LED panel) is one of mainstream light source modes in the industry. Display devices including Mini LED backlight modules have higher peak luminance, longer lifetime and lower power consumption than conventional display devices. Electronic devices using the Mini LED backlight modules as the backlight sources not only can easily improve screen brightness and picture resolution, but also can achieve better performance in terms of power consumption, lifetime, and the like. However, although the Mini LED backlight module realizes partition control of Mini LED lamp beads that are densely distributed, the halo problem occurs at the same time, which affects display quality of the display device to which the Mini LED backlight module is applied.

SUMMARY

In one aspect, the present disclosure provides a backlight module. The backlight module includes a substrate, a light-emitting layer, and a light refracting layer. The light-emitting layer is disposed on the substrate and includes multiple light-emitting units arranged at intervals. The light-emitting unit is configured to emit light. The light-refracting layer includes multiple first medium parts and multiple second medium parts, where the first medium part covers a surface of the light-emitting unit, and the second medium part is arranged between adjacent first medium parts. The first medium part has a first refractive index $n_1$ for light emitted by the light-emitting unit, and the second medium part has a second refractive index $n_2$ for the light emitted by the light-emitting unit, where $n_1 > n_2$.

In another aspect, the present disclosure provides a display device. The display device includes a display panel and the backlight module, where the display panel is disposed on the light-emitting layer of the backlight module away from the substrate.

BRIEF DESCRIPTION OF THE DRAWINGS

To describe the technical solutions in the embodiments of the present disclosure or in the related art more clearly, the following briefly introduces the accompanying drawings required for describing the embodiments or the related art. Apparently, the accompanying drawings in the following description show merely some embodiments of the present disclosure. Other drawings may also be obtained according to these drawings without creative efforts.

DETAILED DESCRIPTION

The following will clearly and completely describe the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

The terms "first", "second", and the like in the description and claims of the present disclosure and the accompanying drawings are used for distinguishing different objects, rather than for describing a specific order. Furthermore, the terms "include" and "have" and any variations thereof are intended to cover exclusive inclusions. For example, a process, method, system, product or apparatus that includes a series of steps or units is not limited to the listed steps or units, but optionally further includes the steps or units not listed, or optionally further includes other steps or units inherent to the process, method, product or apparatus.

Reference herein to "an embodiment" or "an implementation" means that a particular feature, structure, or characteristic described in connection with the embodiment or implementation may be included in at least one embodiment of the present disclosure. The appearances of this phrase in various places in the description are not necessarily all referring to the same embodiment, nor are separate or alternative embodiments mutually exclusive of other embodiments. It is apparent and implicitly understood by those skilled in the art that the embodiments described herein can be combined with other embodiments.

Figure 1:
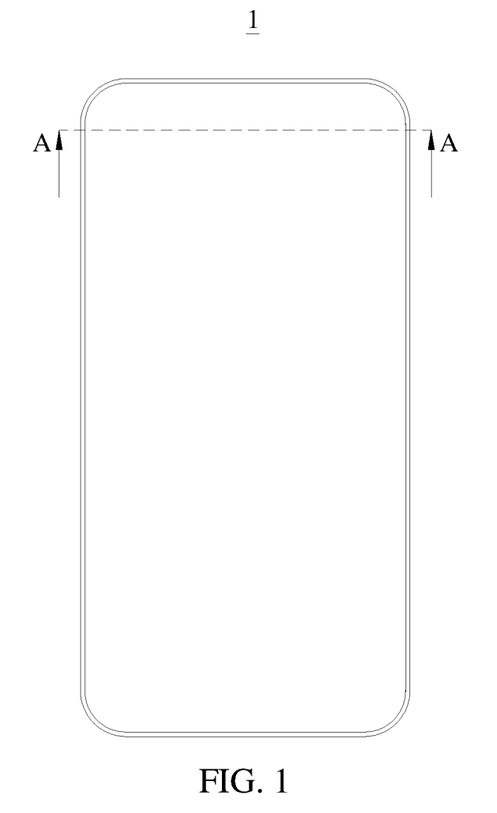
FIG. 1 is a schematic diagram of a display device according to an embodiment of the present disclosure.
Figure 2:
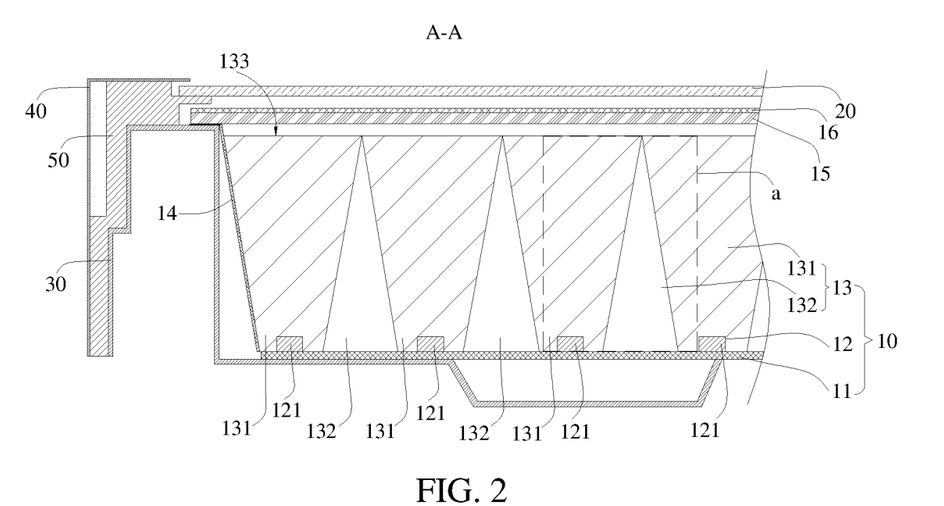
FIG. 2 is a schematic structural diagram of a partial sectional view along line A-A of the display device provided in FIG. 1 in an embodiment.
Figure 3:
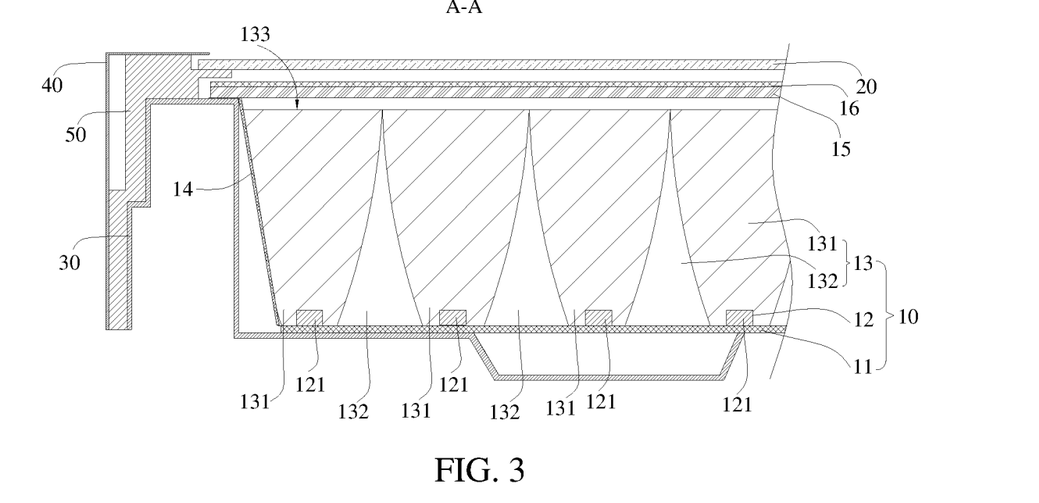
FIG. 3 is a schematic structural diagram of a partial sectional view along line A-A of the display device provided in FIG. 1 in another embodiment.
Figure 4:
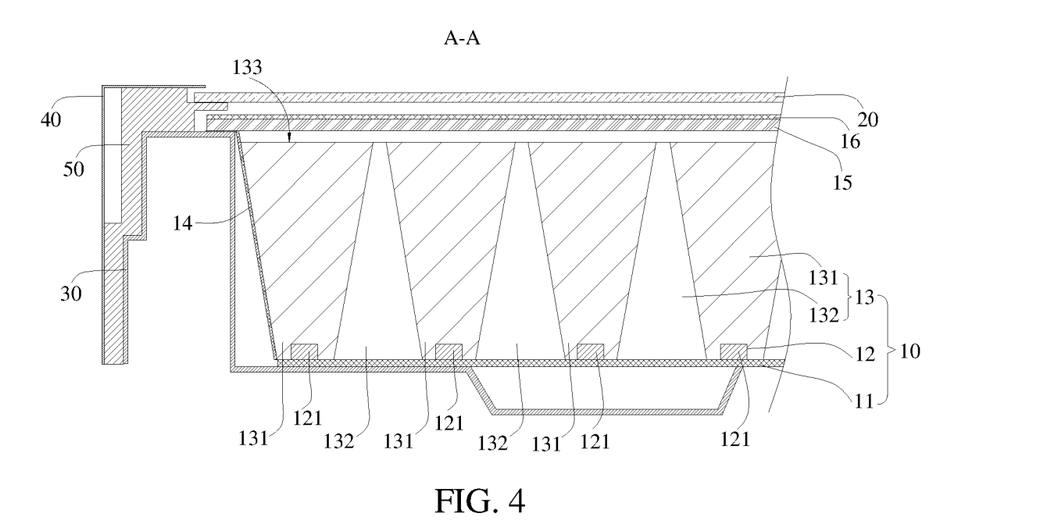
FIG. 4 is a schematic structural diagram of a partial sectional view along line A-A of the display device provided in FIG. 1 in yet another embodiment.

Referring to FIGS. 1, 2, 3 and 4, FIG. 1 is a schematic diagram of a display device according to an embodiment of the present disclosure, FIG. 2 is a schematic structural diagram of a partial sectional view along line A-A of the display device of in FIG. 1 in an embodiment, FIG. 3 is a schematic structural diagram of a partial sectional view along line A-A of the display device provided in FIG. 1 in another embodiment, FIG. 4 is a schematic structural diagram of a partial sectional view along line A-A of the display device provided in FIG. 1 in yet another embodiment. The display device 1 includes a backlight module 10 and other components. The backlight module 10 included in the display device 1 is first introduced in the embodiment of the present disclosure, and other components will be described in detail later. It can be understood that the display device 1 introduced in the embodiment of the present disclosure is only an application scenario of the backlight module 10, and other components in the display device 1 to which the backlight module 10 is applied should not be understood as limitations to the backlight module 10 provided in the embodiment of the present disclosure.

The backlight module 10 according to the embodiment of the present disclosure includes a substrate 11, a light-emitting layer 12 and a light-refracting layer 13. The light-emitting layer 12 is disposed on the substrate 11. The light-emitting layer 12 includes multiple light-emitting units 121 arranged at intervals, and each light-emitting unit 121 is configured to emit light. The light-refracting layer 13 includes multiple first medium parts 131 and multiple second medium parts 132. The first medium part 131 covers a surface of the light-emitting unit 121, and the second medium part 132 is arranged between adjacent first medium parts 131. The first medium part 131 has a first refractive index $n_1$ for the light emitted by the light-emitting unit 121, and the second medium part 132 has a second refractive index $n_2$ for the light emitted by the light-emitting unit 121, where $n_1 > n_2$.

The backlight module 10 may be, but is not limited to, applied to a Light-Emitting Diode (LED) display device and a Mini Light-Emitting Diode (Mini LED) display device. The backlight module 10 is configured to provide a surface light source in the display device 1. It can be understood that the backlight module 10 may also be applied to other display devices 1, and the backlight module 10 provided in the present embodiment should not be limited by application scenarios of the backlight module 10.

The substrate 11 may be configured to support the light-emitting layer 12 and the light-refracting layer 13 in the backlight module 10. The substrate 11 may be, but is not limited to, a Thin Film Transistor (TFT) substrate for providing and transmitting electrical signals. The substrate 11 may be, but is not limited to, a split-type substrate formed by splicing multiple sub-substrates or a one-piece substrate. When the substrate 11 is the split-type substrate formed by splicing multiple sub-substrates, the sub-substrate carries a part of the light-emitting layer 12 and a part of the light-refracting layer 13, thereby facilitating the partition control of the Mini LED display device 1, so as to achieve a better display effect.

The light-emitting layer 12 may be disposed on the substrate 11, and the light-emitting layer 12 may be, but is not limited to, attached to the substrate 11. The light-emitting layer 12 may include multiple light-emitting units 121 arranged at intervals, and the interval between the light-emitting units 121 may be equal or substantially equal, which is not limited thereto, so that the display device 1 achieves a uniform picture display effect.

The light-emitting unit 121 may be an LED light-emitting unit or a Mini LED light-emitting unit. The Mini LED light-emitting unit has a smaller size and a finer spacing, with the grain size between 75 μm-300 μm. Therefore, when the light-emitting units 121 are Mini LED light-emitting units, the display panel to which the backlight module 10 is applied has a high picture definition.

The light-refracting layer 13 may be configured to refract the light emitted by the light-emitting unit 121 so as to change a refraction path of the light emitted by the light-emitting unit 121, thereby adjusting the distribution of the light-emitting regions corresponding to the light-emitting units 121. The light-refracting layer 13 may be attached to a surface of the substrate 11 and a surface of the light-emitting layer 12. The light-refracting layer 13 may include multiple first medium parts 131 and multiple second medium parts 132. The number of the first medium parts 131 may be, but is not limited to, equal to the number of the light-emitting units 121, so as to fully adjust the light emitted by the light-emitting units 121, thereby allowing a good display effect of the display device 1 installed with the backlight module 10.

The first medium part 131 covers a surface of the light-emitting unit 121, so that the first medium part 131 can refract the light emitted from the light-emitting unit 121 in various directions, thereby adjusting a distribution area of the light emitted from the light-emitting unit 121. The first medium part 131 may be, but is not limited to, a structure with an inverted trapezoid cross section (referring to FIGS. 2 and 4) or an approximate inverted trapezoid cross section (referring to FIG. 3). The multiple first medium parts 131 may have, but not limited to, the same or substantially the same shape, so as to facilitate the manufacturing process and enable a uniform display effect of the display device 1. The first medium part 131 may be made of, but not limited to, glass, organic glass, Polyvinylchloride (PV) material, other transparent material, or the like, which has a refraction effect on the light emitted by the light-emitting unit 121 while ensuring transmittance of the light emitted by the light-emitting unit 121, thereby enabling a good display effect of the display device 1.

The second medium part 132 may be disposed between adjacent first medium parts 131, and the second medium part 132 may be attached to a surface of the first medium part 131, so as to achieve a better refraction effect and a more uniform display effect. The second medium part 132 may be, but not limited to, a structure with a wedge-shaped cross section (referring to FIG. 2), an approximate wedge-shaped cross section (referring to FIG. 3), a trapezoid cross section (referring to FIG. 4), or an approximate trapezoid cross section. The multiple second medium parts 132 may have, but not limited to, the same or substantially the same shape, so as to facilitate the manufacturing process and finally enable a uniform display effect of the display device 1. The second medium part 132 may be made of a transparent material having a refractive index smaller than that of the first medium part 131. In the schematic diagrams of the present disclosure, the second medium parts 132 is air for example, so that double refraction of the light emitted by the light-emitting unit 121 can be achieved in the first medium part 131 and the second medium part 132 with a low process cost. Thus, the refraction path of the light emitted by the light-emitting unit 121 can be changed, and the light-emitting areas of the light-emitting layer 12 can be adjusted.

The refractive index of the first medium part 131 for the light emitted from the light-emitting unit 121 is a first refractive index. When the first medium part 131 is made of glass, the refractive index of the first medium part 131 for the light emitted from the light-emitting unit 121 is about 1.5. When the first medium part 131 is made of organic glass, the refractive index of the first medium part 131 for the light emitted from the light-emitting unit 121 is about 1.49. When the first medium part 131 is made of PV material, the refractive index of the first medium part 131 for the light emitted from the light-emitting unit 121 is about 1.52-1.55.

The refractive index of the second medium part 132 for the light emitted from the light-emitting unit 121 is a second refractive index. When the second medium part 132 is air, the refractive index of the second medium part 132 for the light emitted from the light-emitting unit 121 is about 1. It can be understood that the second medium part 132 may also be made of other physical mediums besides air, such as a PV material and organic glass, as long as the second refractive index $n_2$ of the second medium part 132 is smaller than the first refractive index $n_1$ of the first medium part 131.

In summary, the light-refracting layer 13 includes the first medium part 131 and the second medium part 132 having different refractive indexes, The first medium part 131 refracts the light emitted from the light-emitting unit 121, and the second medium part 132 refracts the light emitted from the first medium part 131. That is, the light-refracting layer 13 twice refracts the light emitted from the light-emitting unit 121. As such, beam-shaping/convergence of the light (also referred to as light field) emitted from the light-emitting unit 121 can be achieved. Thus, the light-emitting area corresponding to the single light-emitting unit 121 can be adjusted, and the coupling of the light fields among the multiple light-emitting areas can be coordinated. Further, the probability of occurrence of halo problem can be reduced, enabling a uniform light emission of the whole display device 1 and increasing product quality stability and market competitiveness.

Figure 5:
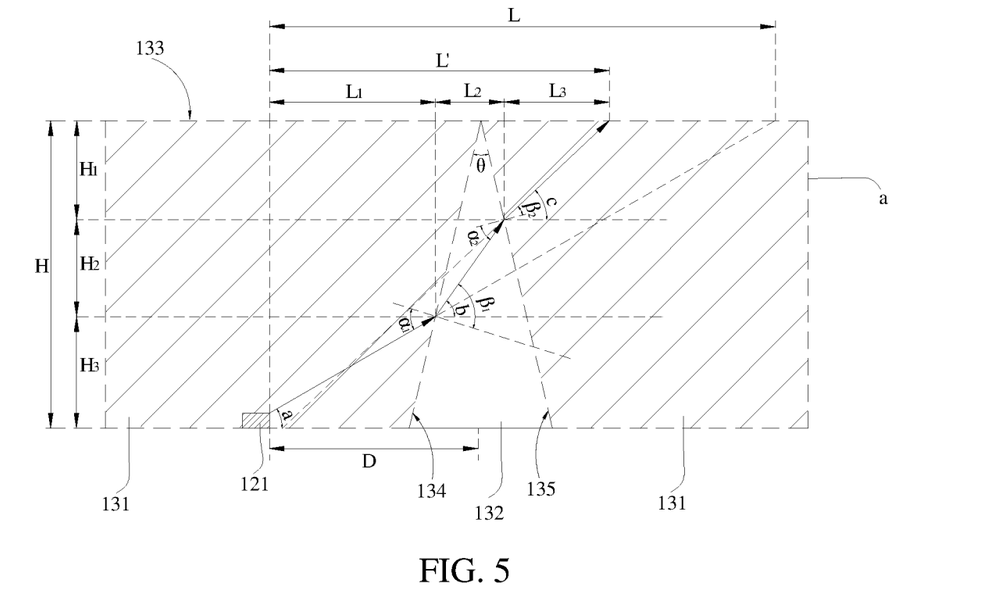
FIG. 5 is a schematic structural diagram of a partial enlarged view of the display device provided in FIG. 2.

Referring to FIGS. 2 and 5, FIG. 5 is a schematic structural diagram of a partial enlarged view of the display device provided in FIG. 2. The partial enlarged view as shown in FIG. 5 is the range as shown in FIG. 2. The light-refracting layer 13 has a light-transmitting surface 133 on a side away from the substrate 11. The light emitted from the light-emitting unit 121 have a first refraction range L and a second refraction range L'. The first refraction range L is a radial distance of a light-emitting range of the light emitted from the light-emitting unit 121 on the light-transmitting surface 133 through an air medium. The second refraction range L' is a radial distance of a light-emitting range of the light emitted by the light-emitting unit 121 and refracted to the light-transmitting surface 133 through the first medium part 131 covering the light-emitting unit 121 and the second medium part 132. The first refraction range L and the second refraction range L' satisfy: L'<L.

The light-refracting layer 13 has the light-transmitting surface 133 away from the substrate 11. When the first medium parts 131 and the second medium parts 132 are coplanar at the side away from the substrate 11, the light-transmitting surface 133 may be a plane formed by surfaces of the first medium parts 131 and the second medium parts 132 away from the substrate 11 together. When the first medium parts 131 are not coplanar with the second medium parts 132, the light-transmitting surface 133 may be a plane formed by surfaces of the first medium parts 131 away from the substrate 11.

The first refraction range L is the radial distance of the light-emitting range of the light emitted from the light-emitting unit 121 on the light-transmitting surface 133 through the air medium, that is, the radius distance of the light-emitting range of the light emitted from the light-emitting unit 121 on the light-transmitting surface 133 through the air medium when no light-refracting layer 13 is provided on the surface of the light-emitting unit 121. When the light-emitting unit 121 emits light, the light is radiated outwards and is projected into a circular or substantially circular light-emitting range on the light-transmitting surface 133, and the radial distance of the light-emitting range is defined as the first refraction range L.

The second refraction range L' is the radial distance of the light-emitting range of the light emitted from the light-emitting unit 121 and refracted to the light-transmitting surface 133 through the first medium part 131 covering the light-emitting unit 121 and the second medium part 132. When the light-emitting unit 121 emits light, the light is radiated outwards and is projected into a circular or substantially circular light-emitting range on the light-transmitting surface 133, and the radial distance of the light-emitting range is defined as the second refraction range L'. The second refraction range L' may also cover the first medium part 131, the second medium part 132 and another adjacent first medium part 131.

The first refraction range L and the second refraction range L' satisfy: L'<L. Because the first refractive index $n_1$ of the first medium part 131 is greater than the second refractive index $n_2$ of the second medium part 132, the second refraction range L' can be finally less than the first refraction range L by adjusting the structural design of the first medium part 131 and the second medium part 132. Thus, the light emitted from the light-emitting unit 121 is converged in the vertical direction. Compared with the light-emitting unit 121 without the light-refracting layer 13 provided on the surface, overlapping of the light emitted from the light-emitting units 121 can be reduced, thereby reducing halo occurred in the display device 1. As a result, normal operation and the picture display effect of the display device 1 can be ensured.

Referring to FIGS. 2 and 5 again, a first interface 134 exists between the second medium part 132 and the first medium part 131, and a second interface 135 exists between the second medium part 132 and another adjacent first medium part 131. The first interface 134, the second interface 135, and the substrate 11 define a receiving space, where the receiving space is for receiving the second medium part 132, and a cross section of the receiving space is in a wedge shape.

The first interface 134, which is between the second medium part 132 and the first medium part 131, may be an interface formed when the second medium part 132 is attached to the first medium part 131. The first interface 134 may be planar or substantially planar. In the schematic diagram of the embodiment of the present disclosure, the first interface 134 is illustrated to be planar as an example, which can facilitate implementation of the process flow and design and calculation of the path of the light emitted by the light-emitting unit 121.

The second interface 135, which is between the second medium part 132 and another adjacent first medium part 131, may be an interface formed when the second medium part 132 is attached to another adjacent first medium part 131. The second interface 135 may be planar or substantially planar. In the schematic diagram of the embodiment of the present disclosure, the second interface 135 is illustrated to be planar as an example, which can facilitate implementation of the process flow and design and calculation of the path of the light emitted by the light-emitting unit 121.

The first interface 134 and the second interface 135 may define the receiving space together with the substrate 11. The receiving space is used for receiving the second medium part 132, and the cross section of the receiving space is wedge-shaped. The wedge-shaped design enables the first medium part 131 and the second medium part 132 to have a more stable structure. The cross section of the second medium part 132 may be wedge-shaped. In the schematic diagram of this embodiment, the second medium part 132 is illustrated to be filled with air and have the wedge-shaped cross section as an example. This facilitates implementation of a process flow, allows a low process cost of the backlight module 10, and facilitates design and calculation of a refraction path of light emitted from the light-emitting units 121, in order to reduce the occurrence of the halo problem in the display device 1.

Referring to FIG. 5 again, the second refraction range L' includes a first refraction sub-range $L_1$, a second refraction sub-range $L_2$ and a third refraction sub-range $L_3$. The first refraction sub-range $L_1$ is a refraction range of the light emitted from the light-emitting unit 121 within the first medium part 131. The second refraction sub-range $L_2$ is a refraction range of the light emitted from the light-emitting unit 121 within the second medium part 132. The third refraction sub-range $L_3$ is a refraction range of the light emitted from the light-emitting unit 121 within the adjacent first medium part 131. The second refraction range L' satisfies: $L'=L_1+L_2+L_3$. The first medium part 131 has a height H, and the height H includes a first sub-height $H_1$, a second sub-height $H_2$, and a third sub-height $H_3$. The first sub-height $H_1$ is the refraction height of the light emitted from the light-emitting unit 121 in the first medium part 131. The second sub-height $H_2$ is the refraction height of the light emitted from the light-emitting unit 121 in the second medium part 132. The third sub-height $H_3$ is the refraction height of the light emitted from the light-emitting unit 121 in the adjacent first medium part 131. The height H satisfies: $H=H_1+H_2+H_3$. The first sub-height $H_1$ satisfies:

$$\frac{H_1}{\tan a} - \frac{H_1}{\cot\left(\frac{\theta}{2}\right)} = D - H \times \tan\left(\frac{\theta}{2}\right)$$

In the above formula, a represents an emitting angle of the light emitted by the light-emitting unit relative to the substrate, θ represents an end angle of the second medium at an end away from the substrate, and D represents a distance from a center point of the second medium to the light-emitting unit The first refraction sub-range $L_1$ satisfies:

$$\frac{H_1}{L_1} = \tan a.$$

The second refraction range L' may include the first refraction sub-range $L_1$, the second refraction sub-range $L_2$ and the third refraction sub-range $L_3$. The first refraction sub-range $L_1$ and the second refraction sub-range $L_2$ may be connected to each other, and the third refraction sub-range $L_3$ may be connected to the second refraction sub-range $L_2$ in a direction away from the first refraction sub-range $L_1$.

The first refraction sub-range $L_1$ may be a refraction range of the light emitted from the light-emitting unit 121 in the first medium part 131. That is, the first refraction sub-range $L_1$ may be a distance (or size) of a projection of the reflection range of the light emitted from the light-emitting unit 121 in the first medium part 131 on the light-transmitting surface 133, and the first sub-refraction range $L_1$ is the refraction range of light emitted from one side of the light-emitting unit 121.

The second refraction sub-range $L_2$ may be a refraction range of the light emitted from the light-emitting unit 121 in the second medium part 132. That is, the second sub-refraction range $L_2$ may be a distance (or size) of a projection of the reflection range of the light emitted from the light-emitting unit 121 in the second medium part 132 on the light-transmitting surface 133, and the second sub-refraction range $L_2$ is the refraction range of light emitted from one side of the light-emitting unit 121.

The third refraction sub-range $L_3$ may be a refraction range of the light emitted from the light-emitting unit 121 in the adjacent first medium part 131. That is, the third refraction sub-range $L_3$ may be a distance (or size) of a projection of the reflection range of the light emitted from the light-emitting unit 121 in the adjacent first medium part 131 on the light-transmitting surface 133, and the third refraction sub-range $L_3$ is a refraction range of light emitted from one side of the light-emitting unit 121.

The second refraction range L' satisfies: $L'=L_1+L_2+L_3$, i.e., the second refraction range L' is a sum of the first refraction sub-range $L_1$, the second refraction sub-range $L_2$ and the third refraction sub-range $L_3$.

The first medium part 131 has the height H, which may be a height of the first medium part 131 in a direction perpendicular to the substrate 11 (which may also be referred to as vertical direction herein). The height H may include the first sub-height $H_1$, the second sub-height $H_2$ and the third sub-height $H_3$. The first sub-height $H_1$ and the second sub-height $H_2$ may be connected, and the third sub-height $H_3$ may be connected with an end of the second sub-height $H_2$ away from the first sub-height $H_1$. The first sub-height $H_1$ may be a height of the refraction range of the light emitted from the light-emitting unit 121 in the first medium part 131 in the vertical direction. The second sub-height $H_2$ may be a height of the refraction range of the light emitted from the light-emitting unit 121 in the second medium part 132 in the vertical direction. The third sub-height $H_3$ may be a height of the refraction range of the light emitted from the light-emitting unit 121 in the adjacent first medium part 131 in the vertical direction.

The height H satisfies: $H=H_1+H_2+H_3$, that is, the height H is the sum of the first sub-height $H_1$, the second sub-height $H_2$ and the third sub-height $H_3$.

The first sub-height $H_1$ may satisfy:

$$\frac{H_1}{\tan a} - \frac{H_1}{\cot\left(\frac{\theta}{2}\right)} = D - H \times \tan\left(\frac{\theta}{2}\right).$$

The first refraction sub-range $L_1$ may satisfy:

$$\frac{H_1}{L_1} = \tan a.$$

The light-emitting angle a represents a light-emitting angle of light emitted from the light-emitting unit 121 with respect to the substrate 11. The light-emitting angle a may be, but is not limited to, 20 degrees, 30 degrees, or 45 degrees.

The end angle θ represents an end angle of the second medium part at an end away from the substrate 11, and the distance D represents a distance between the central point of the second medium part and the light-emitting unit 121. When the end angle θ and the distance D are adjusted, the first sub-height $H_1$ and the first refraction sub-range $L_1$ are correspondingly changed, and further the final height H and the second refraction range L' are changed, so that the refraction path of the light emitted from the light-emitting unit 121 can be adjusted. The adjustment of the light-emitting area can eliminate the halo problem and ensure a good display effect of the display device 1.

Referring to FIG. 5 again, the light emitted from the light-emitting unit 121 is refracted to the first interface 134 at an angle $\alpha_1$, where the angle $\alpha_1$ satisfies:

$$\alpha_1 = a + \left(\frac{\theta}{2}\right).$$

The light emitted from the light-emitting unit 121 also has an angle $\beta_1$ at the first interface 134, where the angle $\beta_1$ satisfies:

$$n_1 \times \sin \alpha_1 = n_2 \times \sin \beta_1$$

The light emitted from the light-emitting unit 121 also has an angle b at the first interface 134, where the angle b satisfies:

$$b = \beta_1 - \left(\frac{\theta}{2}\right).$$

The second sub-height $H_2$ satisfies:

$$H_1 \times \tan\left(\frac{\theta}{2}\right) + H_2 \times \cot b + (H_1 + H_2) \times \tan\left(\frac{\theta}{2}\right) = 2\left(H \times \tan\left(\frac{\theta}{2}\right)\right).$$

The second refraction sub-range $L_2$ satisfies:

$$\frac{H_2}{L_2} = \tan a.$$

As illustrated in FIG. 5, the angle $\alpha_1$ is an angle between the incident light ray into the first interface 134 and the normal (that is, a line perpendicular to the first interface 134), which may also be referred to as an angle of incidence. The angle $\beta_1$ is an angle between the refracted light ray from the first interface 134 and the normal, which may also be referred to as an angle of refraction. The angle b is an angle between the refracted light ray from the first interface 134 and the horizontal line (i.e., the line parallel to the substrate). The light emitted from the light-emitting unit 121 are refracted at the angle $\alpha_1$ to the first interface 134, and when the end angle θ is changed, the angle $\alpha_1$ is changed correspondingly. The light emitted from the light-emitting unit 121 also have the angle $\beta_1$ at the first interface 134, and when the angle $\alpha_1$ changes, the angle $\beta_1$ changes correspondingly. The light emitted from the light-emitting unit 121 also have the angle b at the first interface 134, and when the end angle θ and the angle $\beta_1$ are changed, the angle b also changes correspondingly, and thus the second sub-height $H_2$ and the second sub-refraction range $L_2$ are changed accordingly.

When the end angle θ and the distance D are adjusted, the second sub-height $H_2$ and the second refraction sub-range $L_2$ are correspondingly changed. Thus, the final height H and the second refraction range L' are changed, so that the refraction path of the light emitted from the light-emitting unit 121 can be adjusted, thus achieving adjustment of the light-emitting area. The adjustment of the light-emitting area can reduce the occurrence of the halo problem, guaranteeing the normal operation and the good picture display effect of the display device 1.

Referring to FIG. 5 again, the light emitted by the light-emitting unit 121 also has angles $\alpha_2$ at the second interface 135, where the angles $\alpha_2$ satisfy:

$$\alpha_2 = \beta_1 - \theta$$

The light emitted from the light-emitting unit 121 also has an angle $\beta_2$ at the second interface 135, where the angle $\beta_2$ satisfies:

$$n_2 \times \sin \beta_2 = n_1 \times \sin \beta_2$$

The light emitted by the light-emitting unit 121 also has an angle c at the second interface 135, where the angle c satisfies:

$$c = \beta_2 + \left(\frac{\theta}{2}\right).$$

The third refraction sub-range $L_3$ satisfies:

$$\frac{H_3}{L_3} = \tan c.$$

As illustrated in FIG. 5, the angle $\alpha_2$ is an angle between the incident light ray into the second interface 135 and the normal (that is, a line perpendicular to the second interface 135). The angle $\beta_2$ is an angle between the refracted light ray from the second interface 135 and the normal. The angle c is an angle between the refracted light ray from the second interface 135 and the horizontal line. The light emitted from the light-emitting unit 121 further has the angle $\alpha_2$ at the second interface 135, and when the end angle θ is changed, the angle $\alpha_2$ is changed correspondingly. The light emitted from the light-emitting unit 121 further has the angle $\beta_2$ at the second interface 135, and when the angle $\alpha_2$ changes, the angle $\beta_2$ changes correspondingly. The light emitted from the light-emitting unit 121 further has the angle c at the second interface 135, and when the end angle θ and the angle $\beta_2$ are changed, the angle c also changes correspondingly, so that the third sub-height $H_3$ and the third refraction sub-range $L_3$ are changed accordingly.

When the end angle θ and the distance D are adjusted, the third sub-height $H_3$ and the third sub-refraction range $L_3$ are correspondingly changed. Thus, the final height H and the second refraction range L' are changed, so that the refraction path of the light emitted from the light-emitting unit 121 can be adjusted, thus achieving adjustment of the light-emitting area. The adjustment of the light-emitting area can reduce the occurrence of the halo problem, guaranteeing the normal operation and the good picture display effect of the display device 1.

Figure 6:
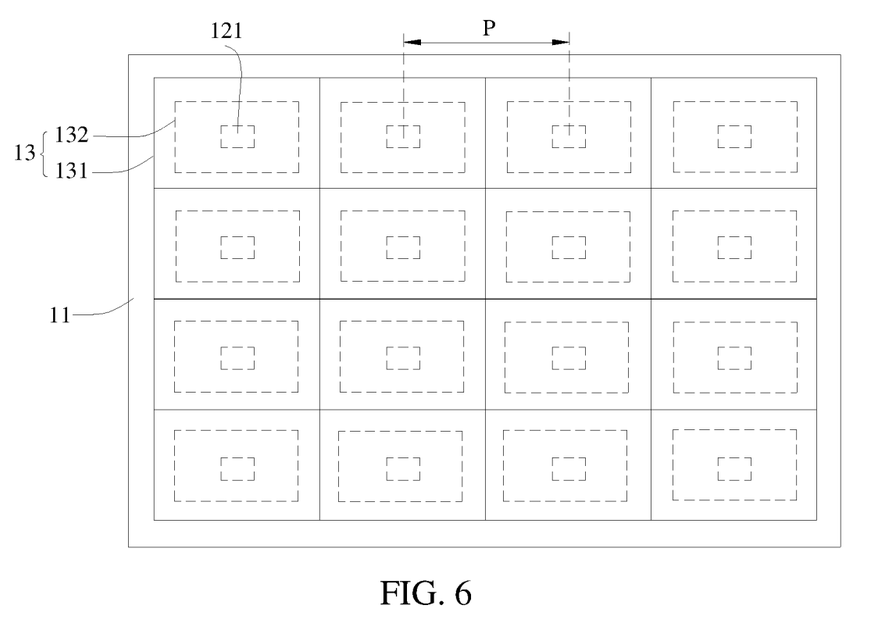
FIG. 6 is a schematic top view of a partial structure of a backlight module according to an embodiment of the present disclosure.

Referring to FIG. 6, FIG. 6 is a schematic top view of the backlight module 10 according to an embodiment of the present disclosure. A distance between central points of two adjacent light-emitting units 121 is P, and the distance P between the central points satisfies: $P \leq (L_1 + L_2 + L_3) \ast 2$.

The central points of two adjacent light-emitting units 121 may be separated by P. When the distance P is less than $(L_1+L_2+L_3)*2$, the lights emitted from two adjacent light-emitting units 121 have relatively less overlap by adjusting the structure of the first medium part 131 and the second medium part 132, i.e., by adjusting the end angle θ and the distance D, thereby ensuring that there is no dark shadow in the display device 1 and effectively reducing the halo problem existing in the display device 1.

When the distance P is equal to $(L_1+L_2+L_3)*2$, the lights emitted from two adjacent light-emitting units 121 do not overlap or almost not overlap by adjusting the structure of the first medium part 131 and the second medium part 132, i.e., by adjusting the end angle θ and the distance D. Thus, the halo problem existing in the display device 1 can be eliminated, enabling an overall illumination uniformity of the display device 1, ensuring a good display effect of the display device 1, and thereby increasing the quality stability and market competitiveness of the product thereof.

Figure 7:
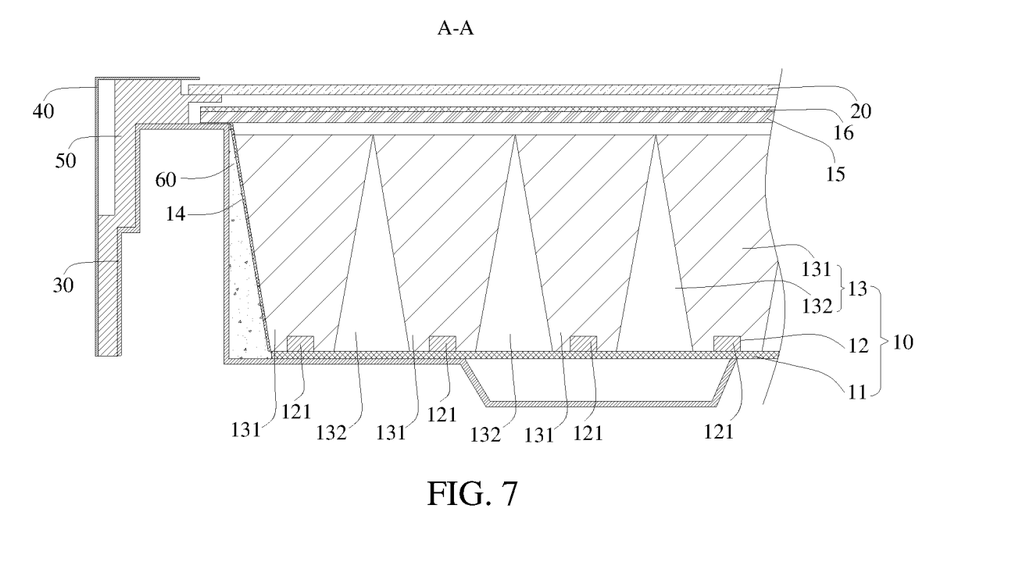
FIG. 7 is a schematic structural diagram of a partial sectional view along line A-A of the display device provided in FIG. 1 in an embodiment.
Figure 8:
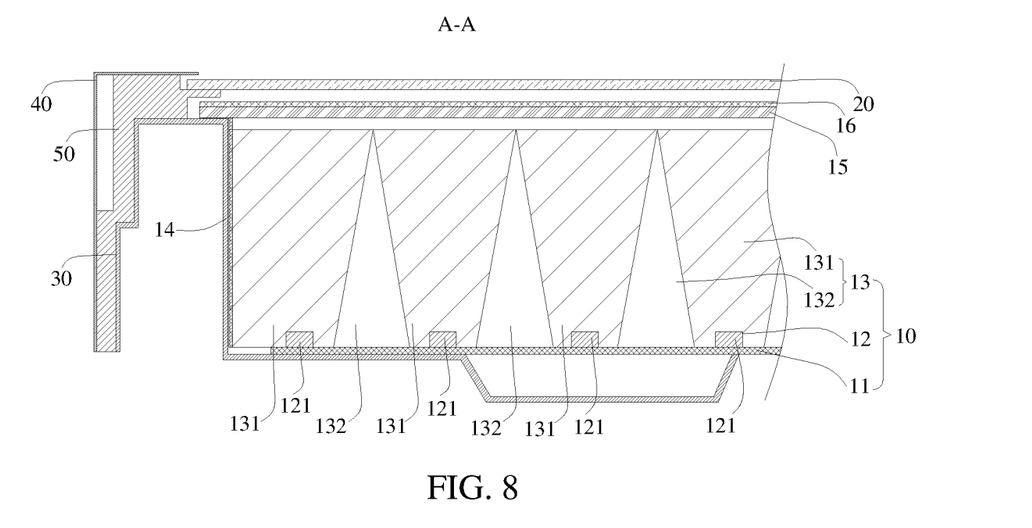
FIG. 8 is a schematic structural diagram of a partial sectional view along line A-A of the display device provided in FIG. 1 in an embodiment.

Referring to FIGS. 7 and 8, FIG. 7 is a schematic structural diagram of a partial sectional view along line A-A of the display device provided in FIG. 1 in an embodiment, and FIG. 8 is a schematic structural diagram of a partial sectional view along line A-A of the display device provided in FIG. 1 in an embodiment. The light-refracting layer 13 is also configured to dissipate heat of the light emitted from the light-emitting unit 121.

The backlight module 10 further includes a reflection plate 14, a diffusion plate 15 and an optical film material 16. The reflection plate 14 is configured to reflect the light, irradiated onto the reflection plate 14 by the backlight module 10, to the display panel 20 of the display device 1 to which the backlight module 10 is applied. The diffuser plate 15 is configured to reflect and scatter uniformly the light emitted from the light-emitting unit 121, so as to ensure uniformity of the screen brightness of the display device 1. The optical film material 16 is used for improving the display brightness and display effect of the display device 1.

The first medium part 131 may be, but is not limited to, attached to the reflection plate 14, so that heat generated during operation of the light-emitting unit 121 is transferred to the reflection plate 14 for heat dissipation, thereby reducing damage to the light-emitting unit 121 caused by an excessively high operating temperature, and further ensuring normal operation of the backlight module 10.

The display device 1 further includes a back plate 30. The reflection plate 14 may be, but is not limited to, attached to the back plate 30, so that heat is directly transferred to the back plate 30 for heat dissipation, thereby enhancing the heat dissipation effect of the backlight module 10 and guaranteeing the normal operation of the backlight module 10.

A heat conduction element 60 may be arranged between the reflection plate 14 and the back plate 30. The heat conduction member 60 may be, but is not limited to, heat dissipation glue or other heat dissipation material. The heat conduction member 60 may be configured to fix the reflection plate 14, and conduct the heat of the reflection plate 14 to the back plate30 for heat dissipation, so that the heat generated by the light-emitting unit 121 can be effectively dissipated. Thus, damage to the light-emitting unit 121 caused by an excessively high operating temperature is reduced, and normal operation of the display device 1 are ensured.

Referring to FIGS. 1 and 2 again, an embodiment of the present disclosure further provides a display device 1. The display device 1 includes a display panel 20 and the backlight module 10 according to any of the above embodiments. The display panel 20 is disposed on a side of the light-emitting layer 12 of the backlight module 10 away from the substrate 11.

The display device 1 may include, but not limited to, the display panel 20 and the backlight module 10. The display device 1 may include, but not limited to, the back plate 30, a frame 40, a rubber frame 50 and the like. The rubber frame 50 is used for fixing and carrying the display panel 20, the optical film 16 and the diffuser plate 15. The frame 40 is used for fixing the display panel 20. The back plate 30 is used for fixing and carrying the backlight module 10.

The backlight module 10 may be configured to provide a surface light source for the display panel 20, and the display panel 20 may be disposed on a side of the light-emitting layer 12 of the backlight module 10 away from the substrate 11. The display panel 20 may be used for receiving the light emitted by the backlight module 10 and finally presenting a display picture. The backlight module 10 includes a first medium part 131 and a second medium part 132 having different refractive indexes, The first medium part 131 refracts the light emitted from the light-emitting unit 121, and the second medium part 132 refracts the light emitted from the first medium part 131, That is to say, the light-refracting layer 13 refracts twice the light emitted from the light-emitting unit 121, thereby realizing the convergence of the light (also referred to as light field) emitted from the light-emitting unit 121, Thus, the distribution of a single light-emitting area is adjusted, and the coupling of light fields among multiple light-emitting areas is coordinated. Thus, the probability of occurrence of halo problem can be reduced, so that the display panel 20 achieves a uniform and excellent display effect.

Figure 9:
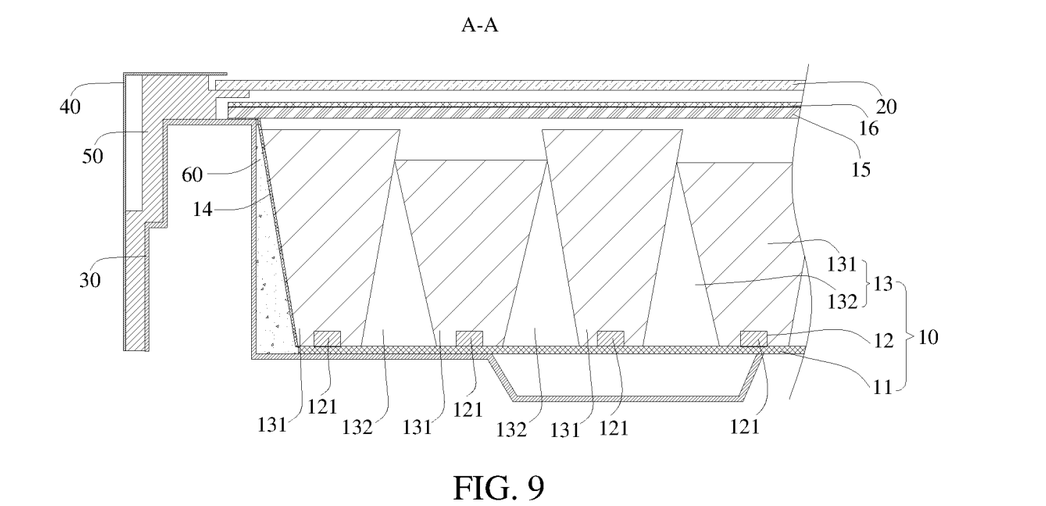
FIG. 9 is a schematic structural diagram of a partial sectional view along line A-A of the display device provided in FIG. 1 in an embodiment.
Figure 10:
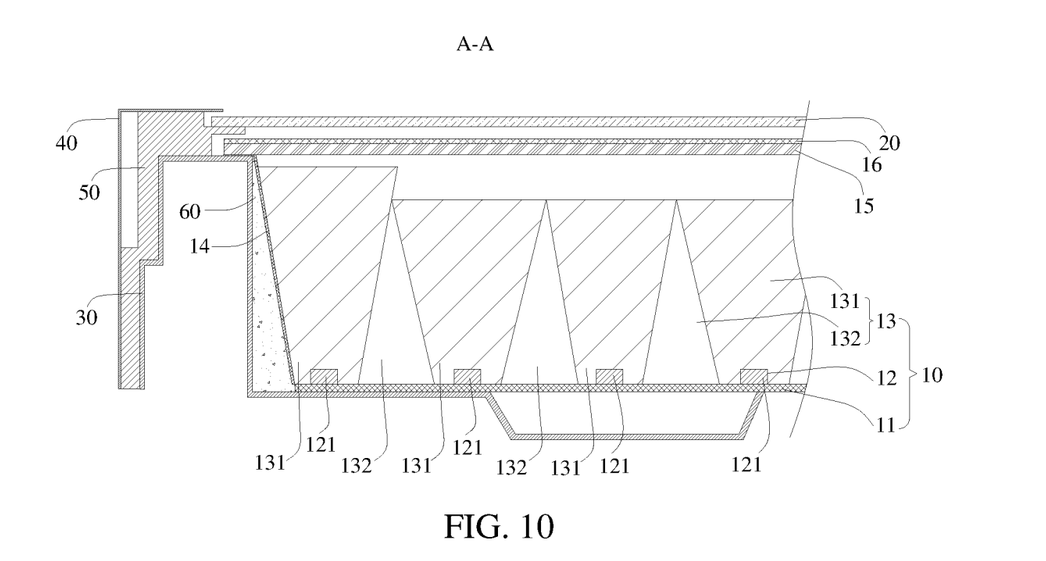
FIG. 10 is a schematic structural diagram of a partial sectional view along line A-A of the display device provided in FIG. 1 in an embodiment.

Referring to FIGS. 9 and 10, FIG. 9 is a schematic structural diagram of a partial sectional view along line A-A of the display device provided in FIG. 1 in an embodiment, FIG. 10 is a schematic structural diagram of a partial sectional view along line A-A of the display device provided in FIG. 1 in an embodiment. A gap exists between the light-transmitting surface 133 of the light-refracting layer 13 and the display panel 20, and the light-refracting layer 13 also serves as a support member in the display device 1.

The light-transmitting surface 133 of the light-refracting layer 13 may be separated with the display panel 20 by the gap, so that there is a certain deformation space when the display panel 20 is pressed by an external force, and thus the display panel 20 is not easily damaged. The light-refracting layer 13 may serve as the support member in the display device 1. In comparison, a conventional optical support column absorb and reflect light in the optical cavity, which will affect the optical display effect to some extent. Furthermore, the conventional optical support column is generally mounted on the substrate 11 through a screw, which may be easily detached from the substrate 11, causing an abnormal display effect of the display device 1. Further, the conventional optical support column usually supports the optical film via the tip, so that when the display panel 20 is pressed, the tip may damage the film. The light-refracting layer 13, serving as the supporting member in the display device 1, can effectively reduce the process costs while making the display panel 20 less likely to be damaged.

Adjacent first medium parts 131 may be, but not limited to, arranged at intervals of high and low in sequence, so that there are gaps of different heights between the first medium parts 131 and the display panel 20, thereby effectively preventing adhesion between the first medium parts 131 and the display panel 20, and further ensuring normal operation of the display device 1.

The first medium part 131 provided at a middle portion of the substrate 11 may be lower than the first medium part 131 provided at a peripheral portion of the substrate 11. Because the middle portion of the display panel 20 is easy to be deformed in a recessed manner, a deformable receiving space is reserved for the middle portion of the display panel 20 while the display panel 20 is supported by the first medium parts 131, so that the display panel 20 is unlikely to be damaged when being pressed by an external force. Thus, normal operation and a stable picture display effect of the display device 1 can be ensured.

The present disclosure provides a backlight module. The backlight module includes a substrate, a light-emitting layer, and a light refracting layer. The light-emitting layer is disposed on the substrate and includes multiple light-emitting units arranged at intervals. The light-emitting unit is configured to emit light. The light-refracting layer includes multiple first medium parts and multiple second medium parts, where the first medium part covers a surface of the light-emitting unit, and the second medium part is arranged between adjacent first medium parts. The first medium part has a first refractive index $n_1$ for light emitted by the light-emitting unit, and the second medium part has a second refractive index $n_2$ for the light emitted by the light-emitting unit, where $n_1>n_2$.

Optionally, the light-refracting layer has a light-transmitting surface away from the substrate.

Optionally, the light emitted by the light-emitting unit has a first refraction range L and a second refraction range L', where the first refraction range L is a radial distance of a light-emitting range of the light emitted by the light-emitting unit on the light-transmitting surface through the air medium, the second refraction range L' is a radial distance of a light-emitting range of the light emitted by the light-emitting unit and refracted to the light-transmitting surface through the first medium part covering the light-emitting unit and the second medium part, and the first refraction range L and the second refraction range L' satisfy: L'<L.

Optionally, there is a first interface between the second medium part and the first medium part, and there is a second interface between the second medium part and another adjacent first medium part. The first interface, the second interface, and the substrate define a receiving space for receiving the second medium part, and a cross section of the receiving space is wedge-shaped.

Optionally, the second refraction range L' includes a first refraction sub-range $L_1$, a second refraction sub-range $L_2$, and a third refraction sub-range $L_3$, where the first refraction sub-range $L_1$ is a refraction range of the light emitted by the light-emitting unit in the first medium part, the second sub-refraction range $L_2$ is a refraction range of the light emitted by the light-emitting unit in the second medium part, and the third sub-refraction range $L_3$ is a refraction range of the light emitted by the light-emitting unit in the adjacent first medium part, and the second refraction range L' satisfies: $L'=L_1+L_2+L_3$.

Optionally, the first medium part has a height H, the height H includes a first sub-height $H_1$, a second sub-height $H_2$, and a third sub-height $H_3$, the first sub-height $H_1$ is a refraction height of the light emitted by the light-emitting unit in the first medium part, the second sub-height $H_2$ is a refraction height of the light emitted by the light-emitting unit in the second medium part, the third sub-height $H_3$ is a refraction height of the light emitted by the light-emitting unit in the adjacent first medium part, and the height H satisfies: $H=H_1+H_2+H_3$.

Optionally, the first sub-height $H_1$ satisfies:

$$\frac{H_1}{\tan a} - \frac{H_1}{\cot\left(\frac{\theta}{2}\right)} = D - H \times \tan\left(\frac{\theta}{2}\right);$$

where a represents an emitting angle of the light emitted by the light-emitting unit relative to the substrate, θ represents an end angle of the second medium at an end away from the substrate, and D represents a distance from a center point of the second medium to the light-emitting unit.

Optionally, the first refraction sub-range $L_1$ satisfies:

$$\frac{H_1}{L_1} = \tan a.$$

Optionally, the light emitted by the light-emitting unit refracts at an angle $\alpha_1$ to the first interface, where the angle $\alpha_1$ satisfies:

$$\alpha_1 = a + \left(\frac{\theta}{2}\right).$$

Optionally, the light emitted by the light-emitting unit has another angle $\beta_1$ at the first interface, where the angle $\beta_1$ satisfies:

$n_1 \times \sin \alpha_1 = n_2 \times \sin \beta_1$

Optionally, the light emitted by the light-emitting unit has another angle b at the first interface, where the angle b satisfies:

$$b = \beta_1 - \left(\frac{\theta}{2}\right).$$

Optionally, the second sub-height $H_2$ satisfies:

$$H_1 \times \tan\left(\frac{\theta}{2}\right) + H_2 \times \cot b + (H_1 + H_2) \times \tan\left(\frac{\theta}{2}\right) = 2\left(H \times \tan\left(\frac{\theta}{2}\right)\right).$$

Optionally, the second refraction sub-range $L_2$ satisfies:

$$\frac{H_2}{L_2} = \tan a.$$

Optionally, the light emitted by the light-emitting unit has an angle $\alpha_2$ at the second interface, where the angle $\alpha_2$ satisfies:

$\alpha_2 = \beta_1 - \theta$

Optionally, the light emitted by the light-emitting unit has another angle $\beta_2$ at the second interface, where the angle $\beta_2$ satisfies:

$n_2 \times \sin \alpha_2 = n_1 \times \sin \beta_2$

Optionally, the light emitted by the light-emitting unit has another angle c at the first interface, where the angle c satisfies:

$$c = \beta_2 + \left(\frac{\theta}{2}\right).$$

Optionally, the third refraction sub-range $L_3$ satisfies:

$$c = \beta_2 + \left(\frac{\theta}{2}\right).$$

Optionally, a distance between center points of adjacent two light-emitting units is P, and the distance P satisfies: $P \leq (L_1 + L_2 + L_3) * 2$.

Optionally, the light-refracting layer is further configured for heat dissipation of the light emitted by the light-emitting unit.

The present disclosure further provides a display device. The display device includes a display panel and the backlight module, where the display panel is disposed on the light-emitting layer of the backlight module away from the substrate.

Optionally, the light-transmitting surface of the light-refracting layer and the display panel has a gap therebetween, and the light-refracting layer further serves as a support member in the display device.

The backlight module provided in embodiments of the disclosure includes the light-emitting layer and the light-refracting layer. The light-refracting layer includes the first medium parts and the second medium parts which have different refractive indexes. The first medium part refracts the light emitted from the light-emitting unit, and the second medium part refracts the light emitted from the first medium part. That is, the light-refracting layer refracts the light emitted by the light-emitting unit twice, so as to converge the light (also known as the light field) emitted by the emitting unit, thus adjusting the distribution of the corresponding light-emitting area of a single light-emitting unit. As such, the coupling between light fields of multiple light-emitting areas can be harmonized and the halo effects can be reduced, thus achieving the overall balance of the light emission of the display device and increasing quality stability and market competitiveness of the product.

Reference to "embodiment" or "implementation" in this disclosure means that a particular feature, structure, or characteristic described in connection with the embodiment can be included in at least one embodiment of the application. The appearances of the phrases in various positions in the description are not necessarily all referring to the same embodiment, nor are separate or alternative embodiments mutually exclusive of other embodiments. It will be apparent to those skilled in the art that the embodiments described herein can be combined with other embodiments. In addition, it should also be understood that, the features, structures, or characteristics described in the embodiments of the present disclosure may be combined arbitrarily without contradiction, so as to form another embodiment without departing from the spirit and scope of the technical solutions of the present disclosure.

Finally, it should be noted that the foregoing embodiments are merely intended to illustrate but not limit the technical solutions of the present disclosure. Although the present disclosure is described in detail with reference to the foregoing embodiments, persons of ordinary skill in the art should understand that modifications or equivalent replacements can be made to the technical solutions of the present disclosure without departing from the spirit and scope of the technical solutions of the present disclosure.

What is claimed is:

1. A backlight module, comprising:

a substrate;

a light-emitting layer disposed on the substrate and comprising a plurality of light-emitting units arranged at intervals, the light-emitting units being configured to emit light; and a light-refracting layer comprising a plurality of first medium parts and a plurality of second medium parts, the first medium part covering a surface of the light-emitting unit, and the second medium part being arranged between adjacent first medium parts; wherein the first medium part has a first refractive index $n_1$ for light emitted by the light-emitting unit, and the second medium part has a second refractive index $n_2$ for the light emitted by the light-emitting unit, wherein $n_1 > n_2$;

the light-refracting layer has a light-transmitting surface away from the substrate; the light emitted by the light-emitting unit has a first refraction range L and a second refraction range L', wherein the first refraction range L is a radial distance of a light-emitting range of the light emitted by the light-emitting unit on the light-transmitting surface through an air medium, the second refraction range L' is a radial distance of a light-emitting range of the light emitted by the light-emitting unit and refracted to the light-transmitting surface through the first medium part covering the light-emitting unit and the second medium part, and the first refraction range L and the second refraction range L' satisfy: L' < L;

there is a first interface between the second medium part and the first medium part, and there is a second interface between the second medium part and another adjacent first medium part, wherein the first interface, the second interface, and the substrate define a receiving space for receiving the second medium part, and a cross section of the receiving space is wedge-shaped;

the second refraction range L' comprises a first refraction sub-range $L_1$, a second refraction sub-range $L_2$, and a third refraction sub-range $L_3$, wherein the first refraction sub-range $L_1$ is a refraction range of the light emitted by the light-emitting unit in the first medium part, the second sub-refraction range $L_2$ is a refraction range of the light emitted by the light-emitting unit in the second medium part, and the third sub-refraction range $L_3$ is a refraction range of the light emitted by the light-emitting unit in the adjacent first medium part, and the second refraction range L' satisfies: $L' = L_1 + L_2 + L_3$; and the first medium part has a height H, the height H comprises a first sub-height $H_1$, a second sub-height $H_2$, and a third sub-height $H_3$, the first sub-height $H_1$ is a refraction height of the light emitted by the light-emitting unit in the first medium part, the second sub-height $H_2$ is a refraction height of the light emitted by the light-emitting unit in the second medium part, the third sub-height $H_3$ is a refraction height of the light emitted by the light-emitting unit in the adjacent first medium part, and the height H satisfies: $H = qjH_1 + H_2 + H_3$; and the first sub-height $H_1$ satisfies:

$$\frac{H_1}{\tan a} - \frac{H_1}{\cot\left(\frac{\theta}{2}\right)} = D - H \times \tan\left(\frac{\theta}{2}\right);$$

wherein a represents an emitting angle of the light emitted by the light-emitting unit relative to the substrate, $\theta$ represents an end angle of the second medium at an end away from the substrate, and D represents a distance from a center point of the second medium to the light-emitting unit; and the first refraction sub-range $L_1$ satisfies:

$$\frac{H_1}{L_1} = \tan a.$$

2. The backlight module of claim 1, wherein the light emitted by the light-emitting unit refracts at an angle $\alpha_1$ to the first interface, wherein the angle $\alpha_1$ satisfies:

$$\alpha_1 = a + \left(\frac{\theta}{2}\right);$$

the light emitted by the light-emitting unit has another angle $\beta_1$ at the first interface, wherein the angle $\beta_1$ satisfies:

$n_1 \times \sin \alpha_1 = n_2 \times \sin \beta_1;$ the light emitted by the light-emitting unit has another angle b at the first interface, wherein the angle b satisfies:

$$b = \beta_1 - \left(\frac{\theta}{2}\right);$$

the second sub-height $H_2$ satisfies:

$$H_1 \times \tan\left(\frac{\theta}{2}\right) + H_2 \times \cot b + (H_1 + H_2) \times \tan\left(\frac{\theta}{2}\right) = 2\left(H \times \tan\left(\frac{\theta}{2}\right)\right);$$

and the second refraction sub-range $L_2$ satisfies:

$$\frac{H_2}{L_2} = \tan a.$$

3. The backlight module of claim 2, wherein the light emitted by the light-emitting unit has an angle $\alpha_2$ with the second interface, wherein the angle $\alpha_2$ satisfies:

$\alpha_2 = \beta_1 - \theta;$ the light emitted by the light-emitting unit has another angle $\beta_2$ at the second interface, wherein the angle $\beta_2$ satisfies:

$n_2 \times \sin \alpha_2 = n_1 \times \sin \beta_2,$ the light emitted by the light-emitting unit has another angle c at the first interface, wherein the angle c satisfies:

$$c = \beta_2 + \left(\frac{\theta}{2}\right);$$

and the third refraction sub-range $L_3$ satisfies:

$$c = \beta_2 + \left(\frac{\theta}{2}\right).$$

4. The backlight module of claim 1, wherein a distance between center points of adjacent two light-emitting units is P, and the distance P satisfies: $P \leq (L_1 + L_2 + L_3) *2$.

5. The backlight module of claim 1, wherein the light-refracting layer is further configured for heat dissipation of the light emitted by the light-emitting unit.

6. The backlight module of claim 1, further comprising a reflection plate, wherein the first medium part is attached to the reflection plate and configured to conduct heat generated by the light-emitting unit to the reflection plate.

7. A display device, comprising a display panel and a backlight module, wherein the backlight module comprises:
a substrate;
a light-emitting layer disposed on the substrate and comprising a plurality of light-emitting units arranged at intervals, the light-emitting units being configured to emit light; and
a light-refracting layer comprising a plurality of first medium parts and a plurality of second medium parts, the first medium part covering a surface of the light-emitting unit, and the second medium part being arranged between adjacent first medium parts; wherein
the first medium part has a first refractive index $n_1$ for light emitted by the light-emitting unit, and the second medium part has a second refractive index $n_2$ for the light emitted by the light-emitting unit, wherein $n_1 > n_2$;
the display panel is disposed on the light-emitting layer of the backlight module away from the substrate;
the light-refracting layer has a light-transmitting surface away from the substrate;
the light emitted by the light-emitting unit has a first refraction range L and a second refraction range L', wherein the first refraction range L is a radial distance of a light-emitting range of the light emitted by the light-emitting unit on the light-transmitting surface through an air medium, the second refraction range L' is a radial distance of a light-emitting range of the light emitted by the light-emitting unit and refracted to the light-transmitting surface through the first medium part covering the light-emitting unit and the second medium part, and the first refraction range L and the second refraction range L' satisfy: L'<L;
there is a first interface between the second medium part and the first medium part, and there is a second interface between the second medium part and another adjacent first medium part, wherein the first interface, the second interface, and the substrate define a receiving space for receiving the second medium part, and a cross section of the receiving space is wedge-shaped;
the second refraction range L' comprises a first refraction sub-range $L_1$, a second refraction sub-range $L_2$, and a third refraction sub-range $L_3$, wherein the first refraction sub-range $L_1$ is a refraction range of the light emitted by the light-emitting unit in the first medium part, the second sub-refraction range $L_2$ is a refraction range of the light emitted by the light-emitting unit in the second medium part, and the third sub-refraction range $L_3$ is a refraction range of the light emitted by the light-emitting unit in the adjacent first medium part, and the second refraction range L' satisfies: $L'=L_1+L_2+L_3$; and the first medium part has a height H, the height H comprises a first sub-height $H_1$, a second sub-height $H_2$, and a third sub-height $H_3$, the first sub-height $H_1$ is a refraction height of the light emitted by the light-emitting unit in the first medium part, the second sub-height $H_2$ is a refraction height of the light emitted by the light-emitting unit in the second medium part, the third sub-height $H_3$ is a refraction height of the light emitted by the light-emitting unit in the adjacent first medium part, and the height H satisfies: $H=H_1+H_2+H_3$; and the first sub-height $H_1$ satisfies:

$$\frac{H_1}{\tan a} - \frac{H_1}{\cot\left(\frac{\theta}{2}\right)} = D - H \times \tan\left(\frac{\theta}{2}\right);$$

wherein a represents an emitting angle of the light emitted by the light-emitting unit relative to the substrate, $\theta$ represents an end angle of the second medium at an end away from the substrate, and D represents a distance from a center point of the second medium to the light-emitting unit; and the first refraction sub-range $L_1$ satisfies:

$$\frac{H_1}{L_1} = \tan a.$$

8. The display device of claim 7, wherein the light-transmitting surface of the light-refracting layer is separated from the display panel by a gap, and the light-refracting layer further serves as a support member in the display device.

9. The display device of claim 7, wherein the light emitted by the light-emitting unit refracts at an angle $\alpha_1$ to the first interface, wherein the angle $\alpha_1$ satisfies:

$$\alpha_1 = a + \left(\frac{\theta}{2}\right);$$

the light emitted by the light-emitting unit has another angle $\beta_1$ at the first interface, wherein the angle $\beta_1$ satisfies:

$n_1 \times \sin \alpha_1 = n_2 \times \sin \beta_1;$ the light emitted by the light-emitting unit has another angle b at the first interface, wherein the angle b satisfies:

$$b = \beta_1 - \left(\frac{\theta}{2}\right);$$

the second sub-height $H_2$ satisfies:

$$H_1 \times \tan\left(\frac{\theta}{2}\right) + H_2 \times \cot b + (H_1 + H_2) \times \tan\left(\frac{\theta}{2}\right) = 2\left(H \times \tan\left(\frac{\theta}{2}\right)\right);$$

and the second refraction sub-range $L_2$ satisfies:

$$\frac{H_2}{L_2} = \tan a.$$

10. The display device of claim 9, wherein the light emitted by the light-emitting unit has an angle $\alpha_2$ with the second interface, wherein the angle $\alpha_2$ satisfies:

$\alpha_2 = \beta_1 - \theta;$ the light emitted by the light-emitting unit has another angle $\beta_2$ at the second interface, wherein the angle $\beta_2$ satisfies:

$n_2 \times \sin \alpha_2 = n_1 \times \sin \beta_2,$ the light emitted by the light-emitting unit has another angle c at the first interface, wherein the angle c satisfies:

$$c = \beta_2 + \left(\frac{\theta}{2}\right);$$

and the third refraction sub-range $L_3$ satisfies:

$$c = \beta_2 + \left(\frac{\theta}{2}\right).$$

11. The display device of claim 7, wherein a distance between center points of adjacent two light-emitting units is P, and the distance P satisfies: $P \leq (L_1+L_2+L_3) *2$.

12. The display device of claim 7, wherein the light-refracting layer is further configured for heat dissipation of the light emitted by the light-emitting unit.

13. The display device of claim 7, wherein the first medium parts are separated from the display panel by gaps of different heights.

14. The display device of claim 13, wherein the first medium part provided at a middle portion of the substrate is lower than the first medium part provided at a peripheral portion of the substrate.

* * * * *